United States Patent
Lu et al.

(10) Patent No.: US 6,986,188 B2
(45) Date of Patent: Jan. 17, 2006

(54) HINGE

(75) Inventors: Sheng-Nan Lu, Shulin (TW); Ching-Hsiang Hsu, Shulin (TW); Yao-Tsung Chan, Shulin (TW)

(73) Assignee: Shin Zu Shing Co., Ltd., (TW)

( * ) Notice: Subject to any disclaimer, the term of this patent is extended or adjusted under 35 U.S.C. 154(b) by 16 days.

(21) Appl. No.: 10/867,361

(22) Filed: Jun. 14, 2004

(65) Prior Publication Data

US 2005/0273977 A1    Dec. 15, 2005

(51) Int. Cl.
  *E05D 11/10*   (2006.01)
  *E05D 7/10*    (2006.01)

(52) U.S. Cl. .......................... 16/330; 16/303; 16/331; 16/342; 16/263; 16/386; 16/387

(58) Field of Classification Search ............... 16/330, 16/303, 342, 334, 386, 387, 321, 331, 332, 16/261–264; 455/575.1, 575.4, 575.8; 361/680–683; 248/917, 919, 922, 923

See application file for complete search history.

(56) References Cited

U.S. PATENT DOCUMENTS

| | | | |
|---|---|---|---|
| 294,746 A * | 3/1884 | Straup et al. | 16/330 |
| 769,035 A * | 8/1904 | Walter | 16/330 |
| 2,362,923 A * | 11/1944 | Pardoe | 16/330 |
| 3,460,190 A * | 8/1969 | MacDonald | 16/303 |
| 5,317,785 A * | 6/1994 | Kobayashi | 16/329 |
| 5,600,868 A * | 2/1997 | Tourville et al. | 16/277 |
| 5,970,819 A * | 10/1999 | Katoh | 74/531 |
| 6,568,032 B1 * | 5/2003 | Ramsauer | 16/329 |
| 6,748,625 B2 * | 6/2004 | Lu | 16/285 |
| 6,757,940 B2 * | 7/2004 | Lu et al. | 16/330 |
| 6,779,234 B1 * | 8/2004 | Lu et al. | 16/340 |
| 2004/0025299 A1 * | 2/2004 | Higano et al. | 16/342 |
| 2004/0078932 A1 * | 4/2004 | Ding-Hone | 16/321 |

FOREIGN PATENT DOCUMENTS

| | | | |
|---|---|---|---|
| DE | 4212181 A1 | * | 10/1993 |
| FR | 2721973 A1 | * | 1/1996 |
| JP | 11303492 A | * | 11/1999 |
| JP | 2002242925 | * | 8/2002 |

* cited by examiner

*Primary Examiner*—Chuck Y. Mah
(74) *Attorney, Agent, or Firm*—Jackson Walker, LLP (57) ABSTRACT

A hinge includes a first leaf assembly with a first leaf and two barrels. A pintle has a cylindrical part extending through a first of the barrels and a non-cylindrical shaft extending through the second barrel. A second leaf is mounted on the pintle. A collar with a non-circular opening is provided outside the shaft. A resilient member is provided between the cylindrical part and the collar. Two channels are defined at a side of the collar facing the second barrel for alternately receiving at least one lug formed on the second barrel. Whereby, when the pintle is turned about the barrels, the first leaf can be positioned at multiple points about the second leaf.

8 Claims, 9 Drawing Sheets

HINGE

BACKGROUND OF THE INVENTION

1. Field of the Invention

The present invention relates to a hinge, and more particular to a hinge which has a function to position a means thereon at multiple points.

2. Description of Related Art

Figure 10:
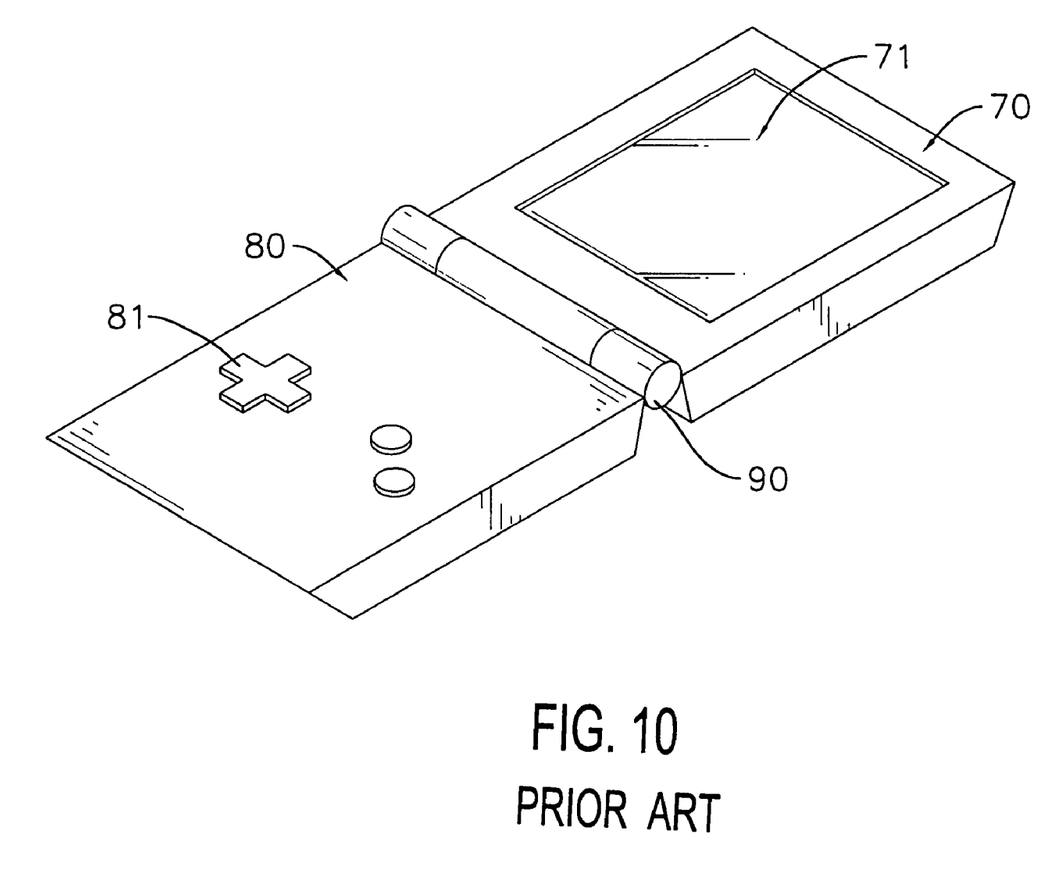
FIG. 10 is a perspective view of the pocket game computer assembled with a conventional hinge.

With reference to FIG. 10, a pocket game computer, such as Game Boy generally has a cover (70) and a body (80) pivotally mounted by a hinge (90). A monitor (71) is installed in the cover (70), and control keys (81) are provided in the body (80). By the hinge (90), the cover (70) can be turned about the body (80) to raise or lower the monitor (71).

However, because the conventional hinge (90) does not have a function to position the cover (70), the monitor (71) can not be fixed at a desired angle for a player. Furthermore, when the player lowers the monitor (71), the cover (70) may be suddenly abut the body (80) to strike the monitor (71), thereby possibly incurring damage.

Therefore, the invention provides a hinge to mitigate or obviate the aforementioned problems.

SUMMARY OF THE INVENTION

The main objective of the present invention is to provide a hinge which has a function to position a means mounted thereon at multiple locations.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
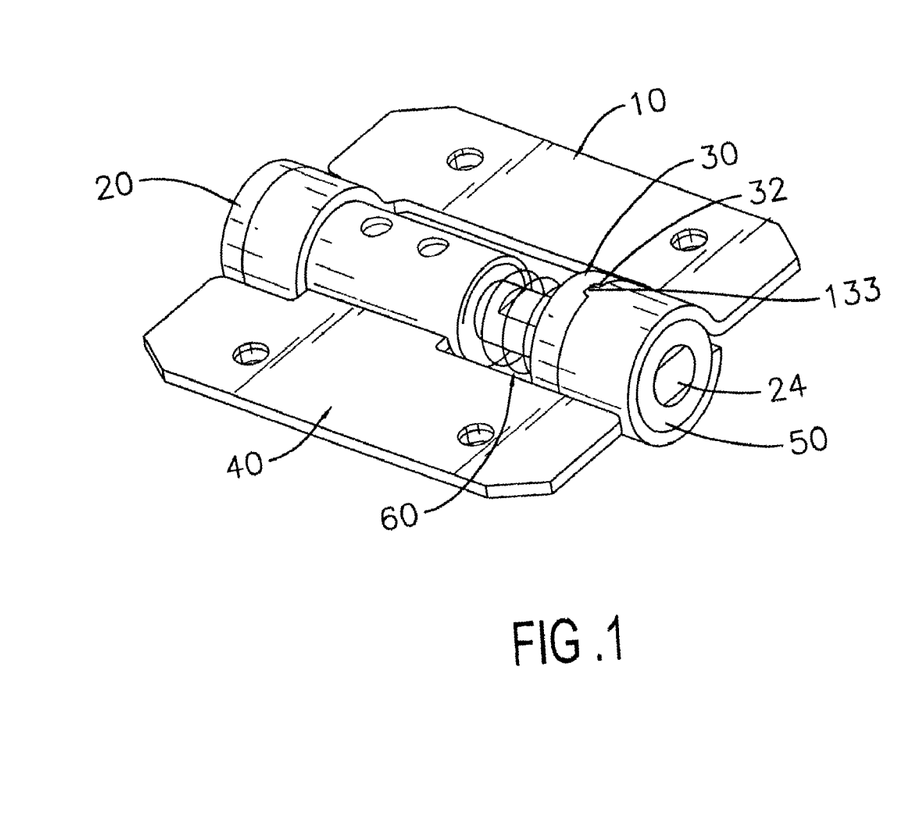
FIG. 1 is a top perspective view of a hinge in accordance with the present invention.
Figure 2:
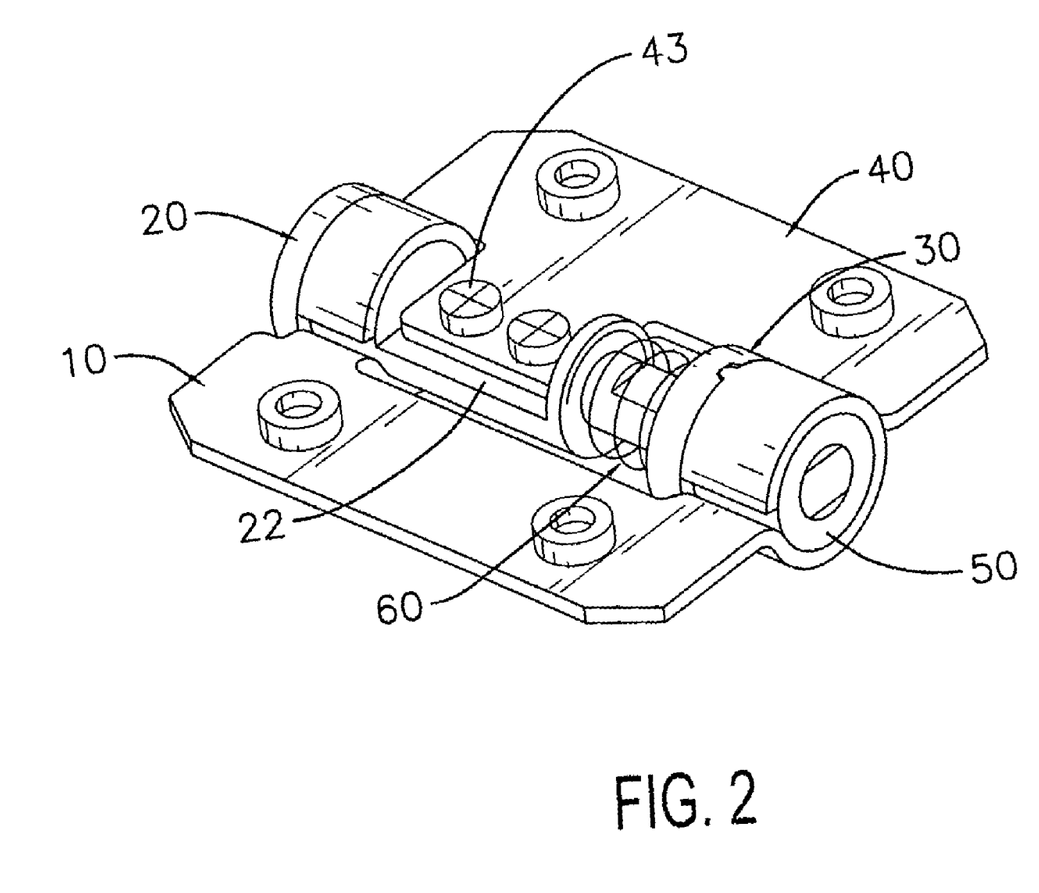
FIG. 2 is a bottom perspective view of the hinge in accordance with the present invention.

With reference to FIGS. 1–2, a hinge in accordance with the present invention is composed of a first leaf assembly (10), a pintle (20), a positioning block (30), a second leaf (40), a collar (50), and a resilient member (60).

Figure 3:
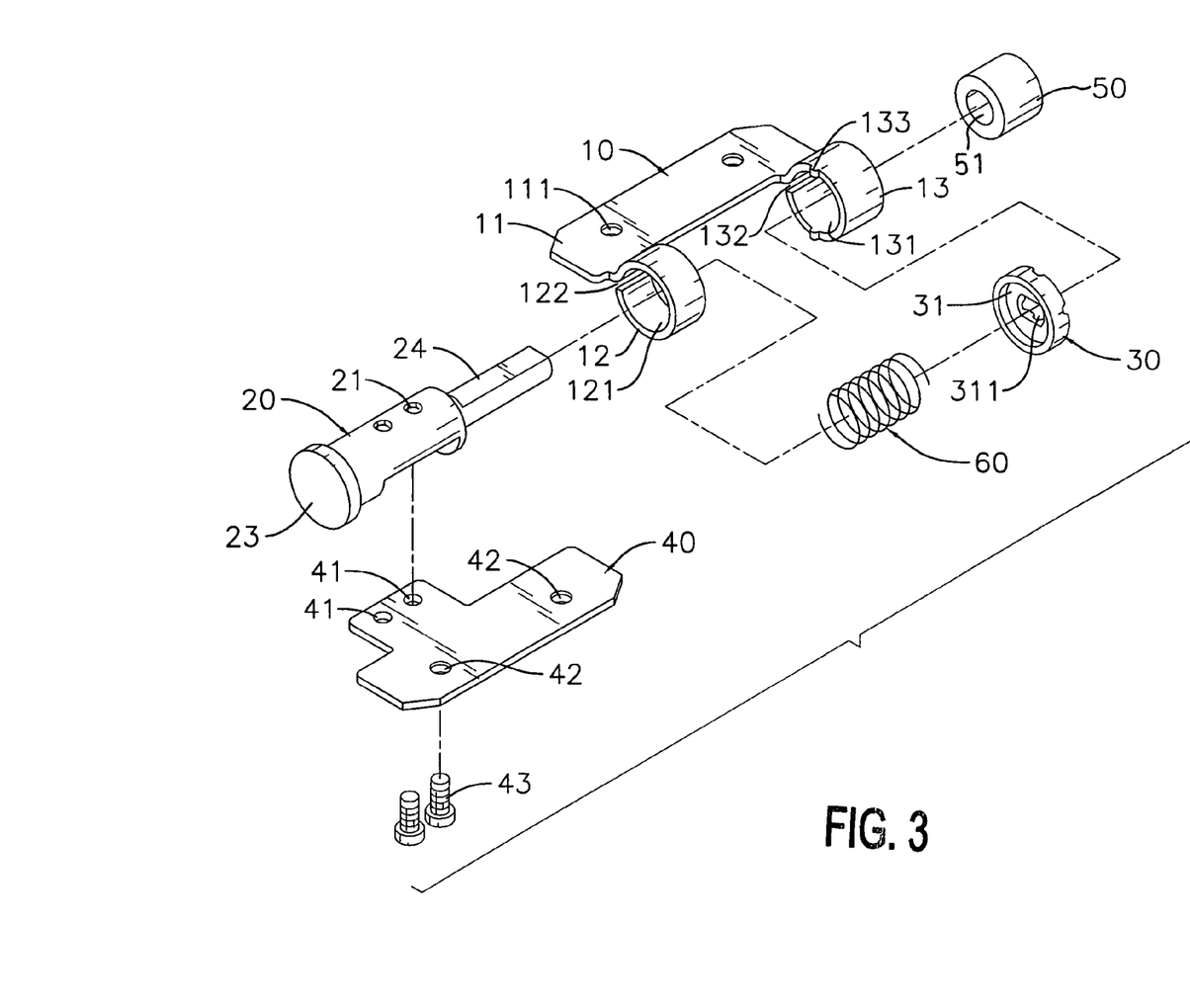
FIG. 3 is a left side exploded perspective view of the hinge in FIG. 1.
Figure 4:
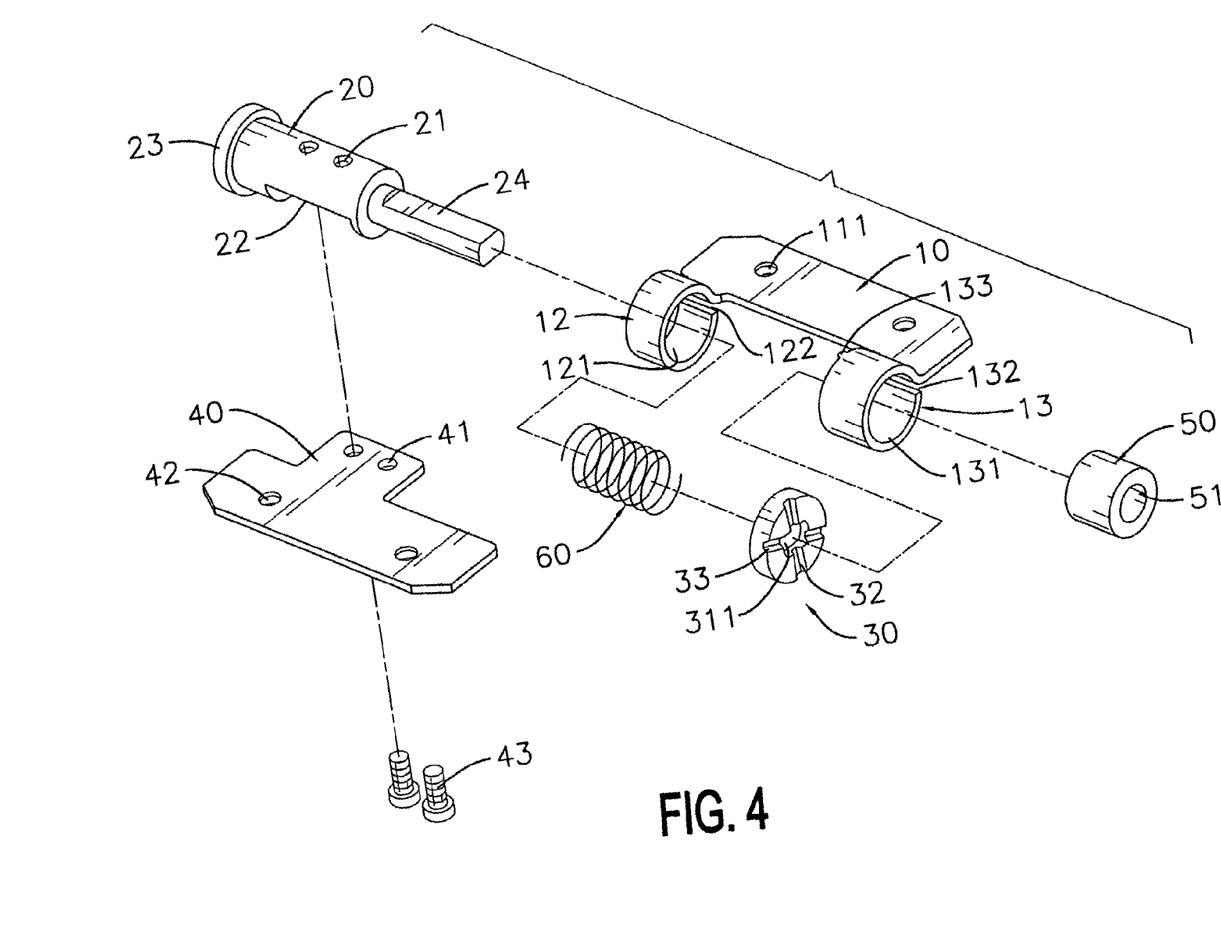
FIG. 4 is a right side exploded perspective view of the hinge in FIG. 1.
Figure 5:
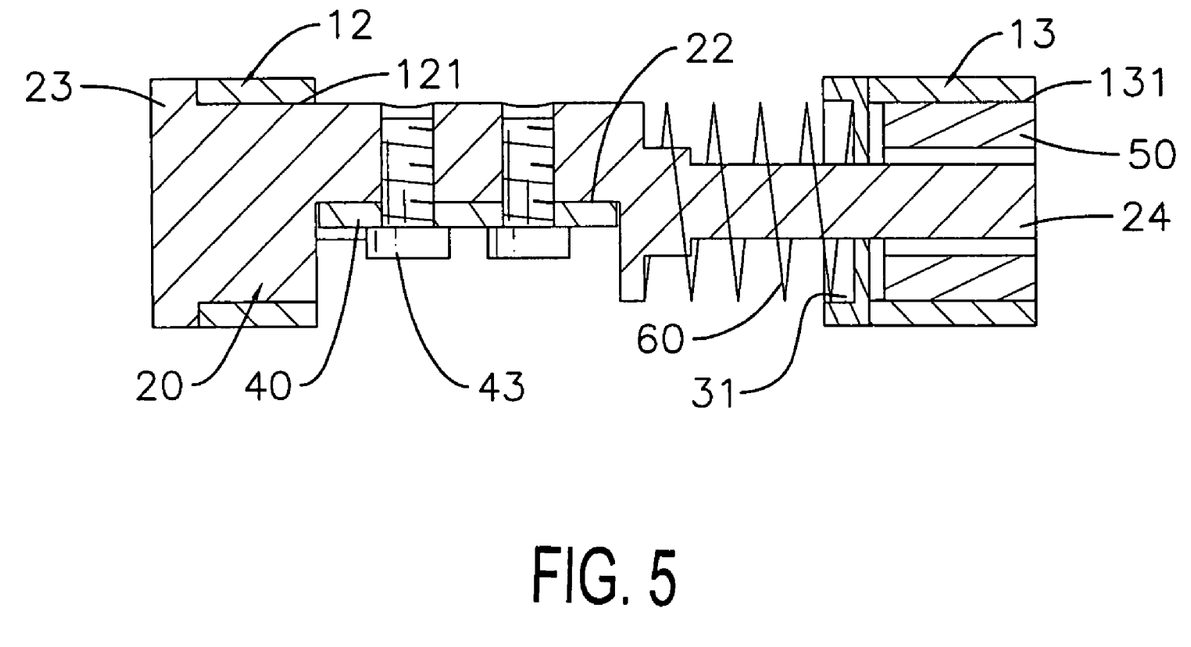
FIG. 5 is a cross sectional view of the hinge.

With reference to FIGS. 3, 4 and 5, the first leaf assembly (10) has a first leaf (11) with at least one first positioning hole (111). A first barrel (12) and a second barrel (13) are formed at a side of the first leaf (11). A first passage (121) and a second passage (131) are respectively defined through the first barrel (12) and second barrel (13) and coaxial with each other. A first notch (122) and a second notch (132) are respectively defined at outer peripheries of the barrels (12, 13). Two arcuate lugs (133) are respectively formed at diametrically opposite sides of a surface of the second passage (131) facing the first passage (121).

The pintle (20) has a cylindrical part extending through the first barrel (12), and a shaft (24) with a non-circular cross section extending through the second barrel (13). A flange (23), with an outer diameter substantially equal to that of the first barrel (12), is formed at an end of the pintle (20) opposite to the shaft (24). A recess (22) is defined at an outer periphery of the cylindrical part of the pintle (20). At least one threaded hole (21) is radially defined in the recess (22) and through the cylindrical part of the pintle (20).

The sleeve (50) is received in the second passage (131) and has a third passage (51) defined therein for receiving the shaft (24), wherein the size of the cross section of the shaft (24) is slightly smaller than an inner diameter of the second passage (131).

The second leaf (40), with a T-like shape, is mounted on the cylindrical part of the pintle (20) and has at least one hole (41) defined through the second leaf (40) and corresponding to the threaded hole (21). By at least one fastener (43) inserted through the hole (41) and threadingly engaged in the threaded hole (21), the second leaf (40) is secured in the recess (22). The second leaf (40) further has at least one second positioning hole (42) defined beside the hole (41).

The collar (30) is provided outside the shaft (24) and between the second barrel (13) and the cylindrical part of the pintle (20). A chamber (31) is defined in the collar (30) and faces the first barrel (12). The resilient member (60) is provided outside the shaft (24) and between the first barrel (12) and the collar (30). A first end of the resilient member (60) abuts the first barrel (12), and a second end of the resilient member (60) is received in the chamber (31). A non-circular opening (311) is defined through the collar (30), and the shaft (24) extending through the non-circular opening (311) can not be rotatable about the collar (30). A first channel (32) and a second channel (33) are defined at a side face of the collar (30) opposed to the chamber (31) and respectively across a circular center of the collar (30). The first channel (32) and second channel (33) are not perpendicular to each other, and each have a tapered cross section for positioning the arcuate lugs (133) therein.

In assembly, with reference to FIGS. 3–4, the collar (30) abuts the second barrel (13) with the arcuate lugs (133) positioned in the first channels (32), and the resilient member (60) is received in the chamber (31). The sleeve (50) is received in the second passage (131), and the shaft (24) in turn extends through the first barrel (12), the resilient member (60), the non-circular opening (311), and the sleeve (50) in the second barrel (13). The resilient member (60) is pressed between the collar (30) and the cylindrical part of the pintle (20). Then, the second leaf (40) is fastened in the recess (22) of the first leaf (20).

Figure 9:
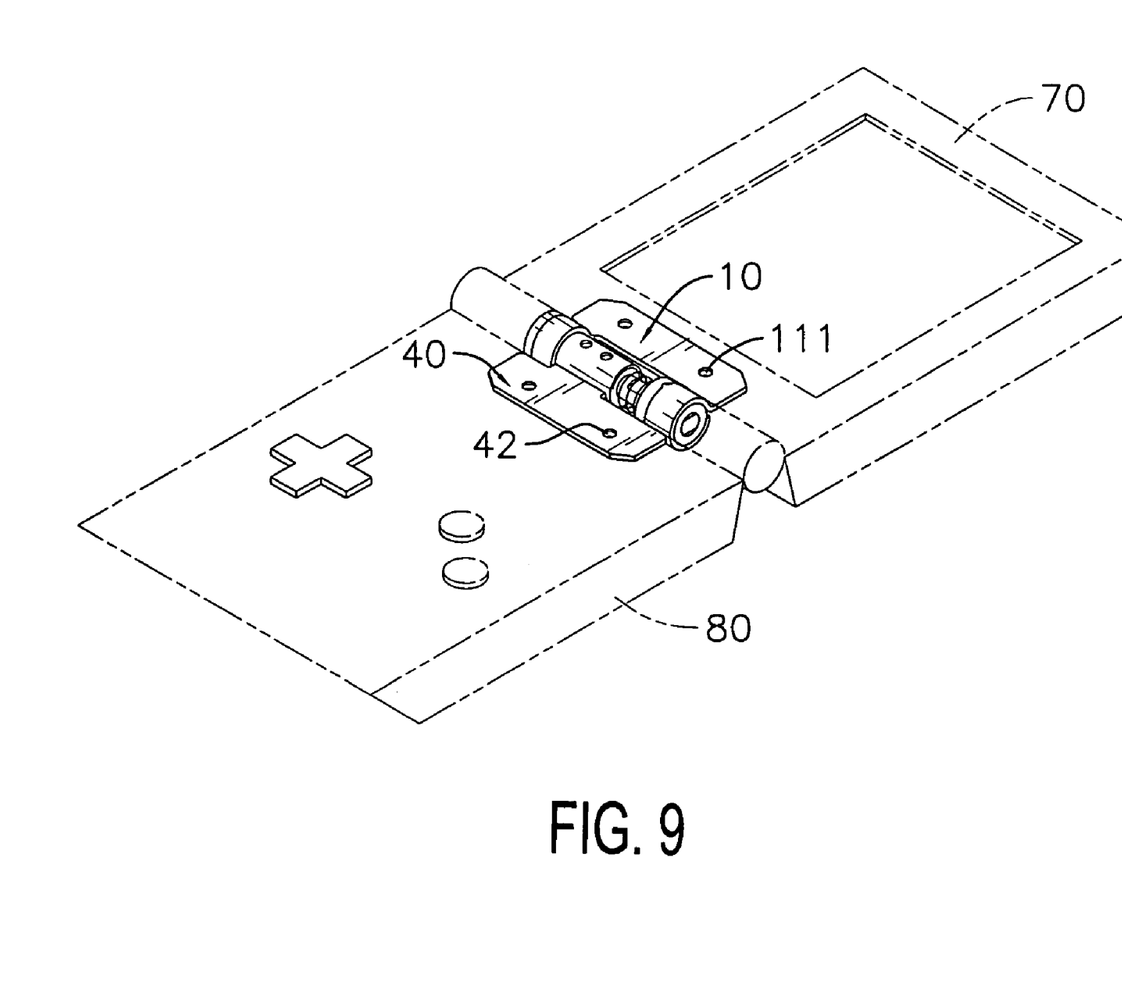
FIG. 9 is a perspective view of the pocket game computer assembled with the hinge of the present invention.

With reference to FIG. 9, the second leaf (40) is mounted on a body (80) of a pocket game computer, and the first leaf (10) is mounted on the monitor (70). For raising the monitor (70), the hinge (10) is turned by the monitor (70) to rotate the pintle (20) along with the collar (30) about the barrels (12, 13).

Figure 6:
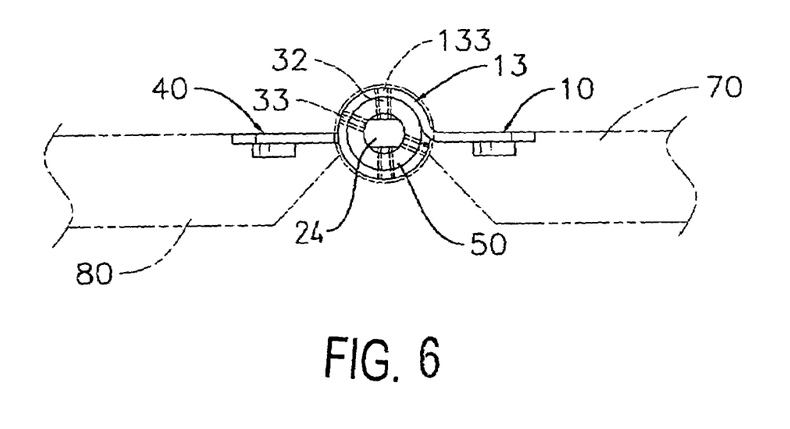
FIG. 6 is a schematic view of the hinge installed in a pocket game computer in a complete open status.

With reference to FIG. 6, the lugs (133) are received in the first channel (32) and the monitor (70) is completely raised from the body (80) and will not be freely moved.

Figure 7:
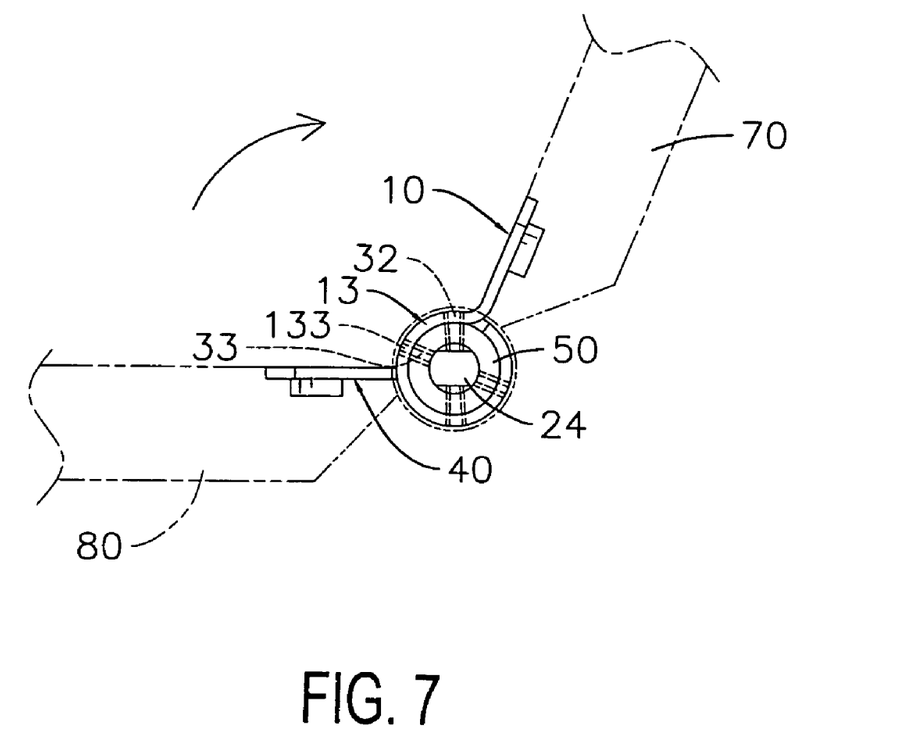
FIG. 7 is a schematic view of the hinge installed in the pocket game computer in a partly open status.

With reference to FIG. 7, when the monitor (70) is turned upwards for adjusting a visual angle, the lugs (133) are received in the second channel (33) to position the monitor (70) at this angle.

Figure 8:
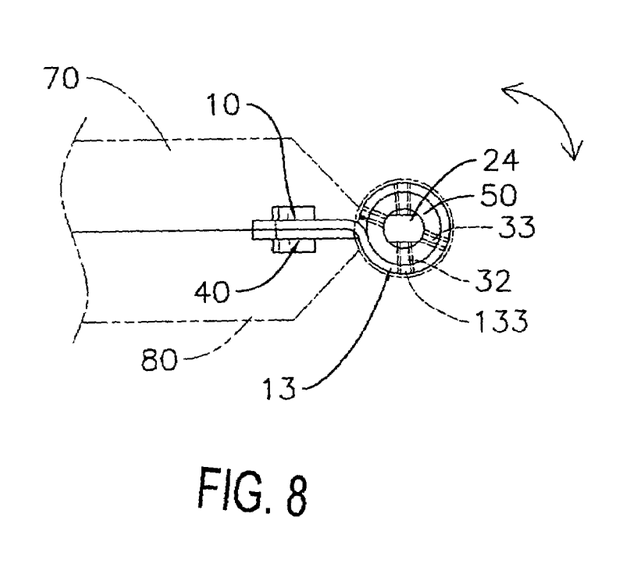
FIG. 8 is a schematic view of the hinge installed in the pocket game computer in a closed status.

With reference to FIG. 8, when the pocket game computer is closed, the monitor (70) abuts the body (80), and the lugs (133) are also positioned in the first channel (32).

Therefore, according to the present invention, the monitor (70) of the pocket game computer can be respectively positioned at the special visual angle, the complete open point and the closed point and will not be freely moved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge comprising:

a first leaf assembly (10) having a first leaf (11), a first barrel (12) and a second barrel (13) formed at a side of the first leaf, a first passage (121) and a second passage (131) respectively defined through the first barrel (12) and second barrel (13) and coaxial with each other, a first notch (122) and a second notch (132) respectively defined at outer peripheries of the barrels (12, 13), and at least one arcuate lug (133) formed at a side of a surface of the second barrel (13) facing the first passage (121);

a pintle (20) having a cylindrical part extending through the first barrel (12), a shaft (24) with a non-circular cross section extending through the second barrel (13), and a flange (23), with an outer diameter substantially equal to that of the first barrel (12) and formed at an end of the pintle (20) opposite to the shaft (24);

a second leaf (40) mounted on the pintle (20); and a collar (30) provided outside the shaft (24) and between the second barrel (13) and the cylindrical part of the pintle (20), the collar having a non-circular opening (311) defined through the collar (30) for the shaft (24) extending through the non-circular opening (311), a first channel (32) and a second channel (33) defined at a side face of the collar (30) opposite to the cylindrical part of the pintle (20) and respectively across a circular center of the collar (30) for the lug (133) alternately received in the channels (32, 33) when the pintle (20) is turned about the barrels (12, 13); and a resilient member (60) provided outside the shaft (24) and between the first barrel (12) and the collar (30), the resilient member (60) having a first end abutting the cylindrical part, and a second end abutting the collar (30).

2. The hinge as claimed in claim 1, wherein the pintle (20) has a recess (22) defined at an outer periphery of the cylindrical part, and the second leaf (40) is mounted in the recess (23) of the pintle (20).

3. The hinge as claimed in claim 1, wherein the collar (30) has a chamber (31) defined at a side facing the cylindrical part of the pintle (20) for receiving the second end of the resilient member (60).

4. The hinge as claimed in claim 1, wherein the first leaf (11) has at least one first positioning hole (111) defined through the first leaf (11), and the second leaf (40) has at least one second positioning hole (42) defined through the second leaf (40).

5. The hinge as claimed in claim 2, wherein the pintle (20) has at least one threaded hole (21) radially defined in the recess (22) and through the cylindrical part of the pintle (20).

6. The hinge as claimed in claim 1 further comprising a sleeve (50) received in the second barrel (13) and having a third passage (51) defined through the sleeve (50) for receiving the shaft (24) of the pintle (20).

7. The hinge as claimed in claim 1, wherein the first and second channels (32, 33) each have a tapered cross section.

8. The hinge as claimed in claim 1, wherein the first and second channels (32, 33) have an included angle between them that is not 90 degrees.

* * * * *